(No Model.)
S. D. MADDIN.
HARVESTER.
No. 309,234. Patented Dec. 16, 1884.
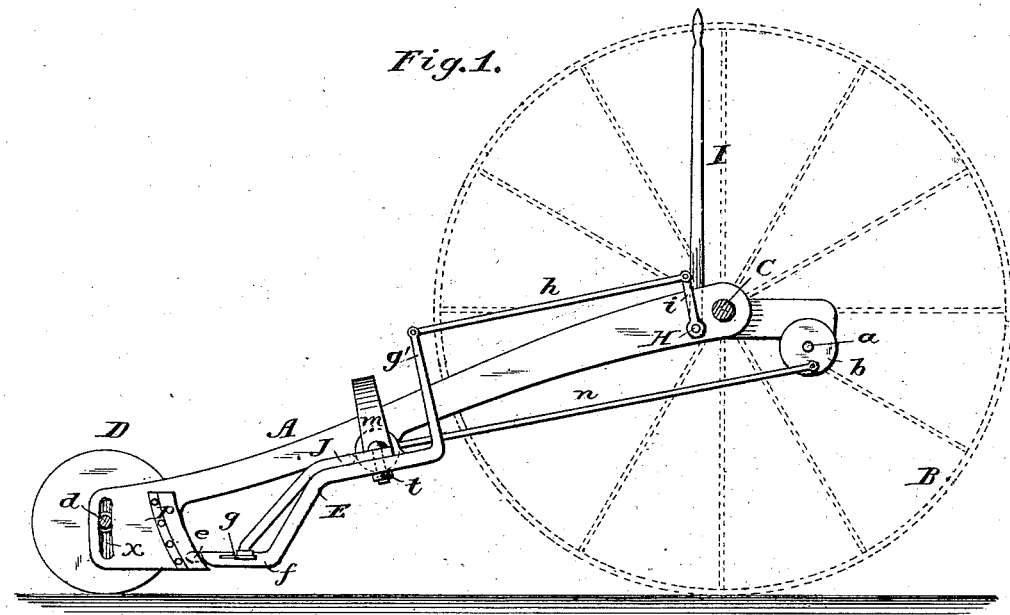
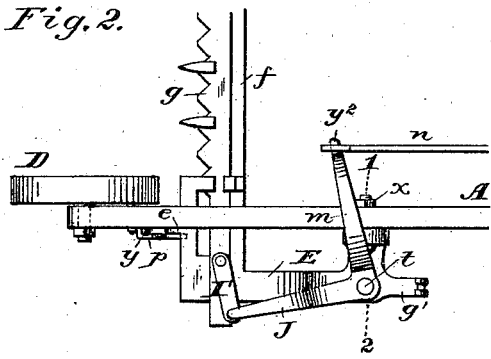
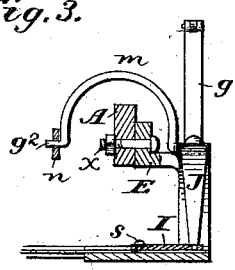
Attest:
Court A. Cooper.
Josephine Campbell.
S. D. Maddin
Inventor:
By Foster & Freeman
Attys

UNITED STATES PATENT OFFICE.

SAMUEL D. MADDIN, OF MIAMISBURG, OHIO, ASSIGNOR TO MARY MADDIN, OF SAME PLACE.

HARVESTER.

SPECIFICATION forming part of Letters Patent No. 309,234, dated December 16, 1884.

Application filed November 10, 1883. (No model.)

*To all whom it may concern:*

Be it known that I, SAMUEL D. MADDIN, a citizen of the United States, and a resident of Miamisburg, in the county of Montgomery and State of Ohio, have invented certain new and useful Improvements in Harvesters, of which the following is a specification.

My invention relates to that class of harvesting or mowing machines in which the frame is supported in a relatively permanent position; and my invention consists of means, fully described hereinafter, whereby the cutting apparatus may be adjusted to any desired height in respect to the frame, and whereby the knife-bar may be driven from the main supporting-wheels without disarrangement from the adjustment of the cutting apparatus.

In the drawings, Figure 1 is a side elevation of sufficient of a harvesting-machine to illustrate my improvements. Fig. 2 is a plan of part of the machine, illustrating the cutter-bar-driving devices. Fig. 3 is a sectional elevation on the line 1 2, Fig. 2.

The main frame A of the machine is of any suitable construction, and is supported at the rear by the wheels B, from which, or from the axle C, is driven a crank-shaft, $a$, carrying a crank-wheel, $b$.

At the front ends of the side pieces of the frame A are slots $x$, receiving screw-bolts $d$, adjustable in said slots, and constituting studs, on which turn the front supporting lead-wheels, D, so that the front of the frame may be set at any desired height from the ground and there supported. The finger-bar $f$ supports the knife-bar $g$, and is supported or carried at each end by a pivoted bracket, E, hung by a bolt or pin, $x$, to the side of the main frame, and provided with an arm, $g'$, connected by a rod, $h$, to an arm, $i$, of a shaft, H, turning in bearings on the main frame, and provided with a lever, I, by moving which the brackets E may be rocked to alter the height of the cutting apparatus from the ground.

To preserve the relative position of the frame and brackets, each of the latter has a lip, $e$, which enters a curved groove, $y$, between the sides of the frame and a curved guide, $p$, bolted to the latter. The knife-bar is driven from the crank-wheel $b$ through the medium of a bell-crank lever, J, and a pitman, $n$. The lever J is pivoted at its angle to one of the brackets E by a pin, $t$, and the inwardly-projecting arm $m$ of the lever is arched to extend over the side bar of the frame, and the pin $y^2$, to which the end of the pitman $n$ is connected, is arranged at a point directly opposite the pivot $x$ of the bracket, so that the rocking of the latter, carrying with it the lever J, will not carry the pin $y^2$ any appreciable extent to or from the driving-disk $b$, whereby the rocking movement of the cutting apparatus will not disarrange the connections or change the position of the knife-bar. The lever J is connected by a link, I', to the knife-bar, said link having a hole at each end, one receiving a stud, $s$, projecting from the knife-bar, and the other a stud on the end of the lever J. This simple connection is durable, and not likely to be disarranged in the operation of the machine.

Without limiting myself to the precise construction of parts shown and described, I claim—

1. The combination of the frame provided with guideways near the ends of the finger-bar, the pivoted brackets carrying the finger-bar, and provided with lips extending into said guideways, and devices for adjusting the brackets, substantially as specified.

2. The combination, with the brackets pivoted to the sides of the frame and supporting the finger-bar, of a bell-crank lever pivoted to one of the brackets adjacent to the pivot thereof, and connected to the knife-bar, and having a connecting-pin for the pitman arranged in the same plane with the pivot of the bracket, substantially as specified.

3. The combination of the frame, brackets pivoted to the sides and below the upper edges thereof, the knife-bar, and operating-lever J, pivoted to one of the brackets and extended over the side bar of the frame and connected to the pitman in the same plane with the pivot-point, substantially as set forth.

4. The combination of the frame, brackets pivoted thereto, and lever pivoted to one of the brackets, and extending over the frame and connected to the finger-bar and to the pitman, the pivots of the bracket and pitman being in the same plane, and the pivot of the lever being adjacent to said plane, substantially as described.

In testimony whereof I have signed my name to this specification in the presence of two subscribing witnesses.

SAMUEL D. MADDIN.

Witnesses:
 AMOS K. CLAY,
 ADAM CLAY.